R. E. HELLMUND.
INDUCTION MOTOR.
APPLICATION FILED AUG. 2, 1909.

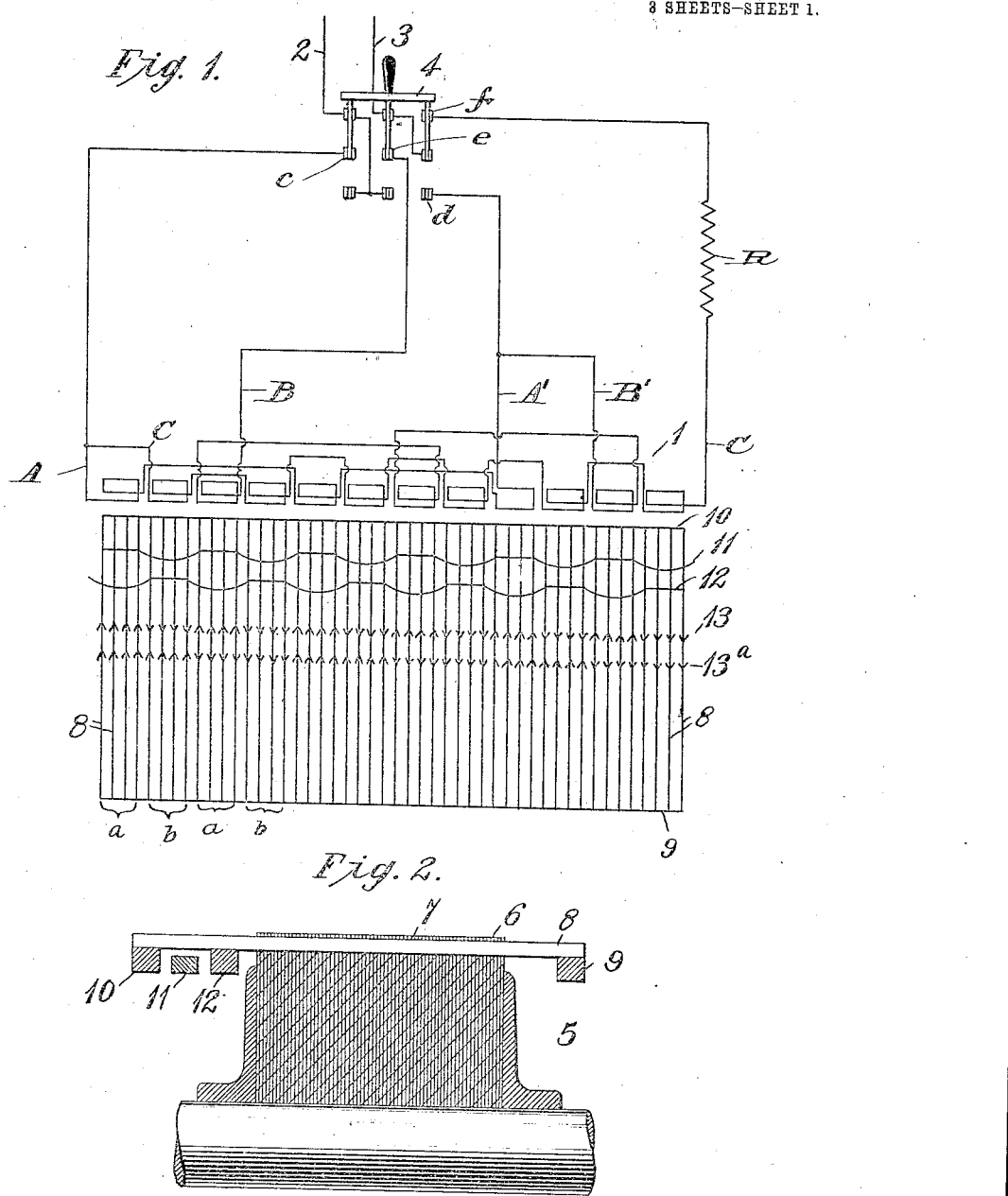

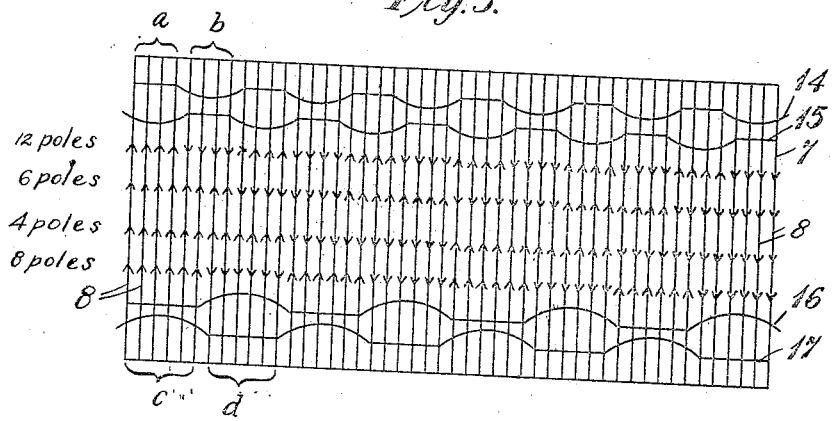
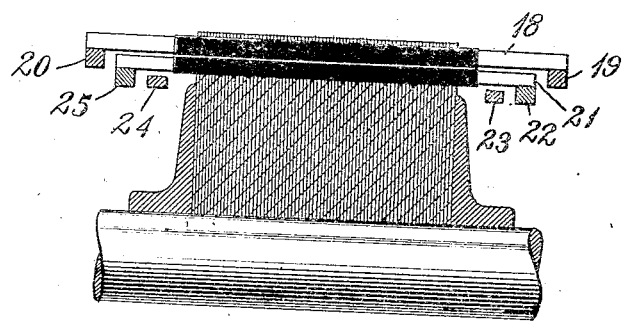

1,116,424.

Patented Nov. 10, 1914.
3 SHEETS—SHEET 3.

WITNESSES:
Fred H. Miller

INVENTOR
Rudolf E. Hellmund
BY
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, OF PITTSBURGH, PENNSYLVANIA, A CORPORATION OF PENNSYLVANIA.

INDUCTION-MOTOR.

1,116,424.   Specification of Letters Patent.   Patented Nov. 10, 1914.

Application filed August 2, 1909. Serial No. 510,840.

*To all whom it may concern:*

Be it known that I, RUDOLF E. HELLMUND, a subject of the German Empire, and a resident of Pittsburgh, in the county of Allegheny and State of Pennsylvania, have invented a new and useful Improvement in Induction-Motors, of which the following is a specification.

My invention relates to dynamo electric machines, and particularly to non-sychronous alternating-current motors.

The object of my invention is to provide an improved secondary winding of the squirrel-cage type for multi-speed induction motors, whereby the slip and the torque of the motor for each speed may be independently predetermined to accommodate special conditions of operation.

The primary windings of induction motors are frequently adapted for producing two or three different numbers of poles in order to provide for different operating speeds. Under these conditions, if the usual form of squirrel-cage secondary windings is employed, the slip, or the difference between the actual speed and the synchronous speed, is considerable for the higher speeds and is less for the lower speeds. In some cases, however, it is desirable to reduce the slip for the higher speeds and to materially increase the slip for the lower speeds.

In order to accomplish the aforesaid objective results, I provide, in addition to the end-connecting rings of the rotor, one or more auxiliary rings, which only inter-connect certain groups of bars instead of being connected to all of the bars, the circuit connections being such that the auxiliary rings are only active when the machine is operating at the higher speed or speeds.

Figure 5:
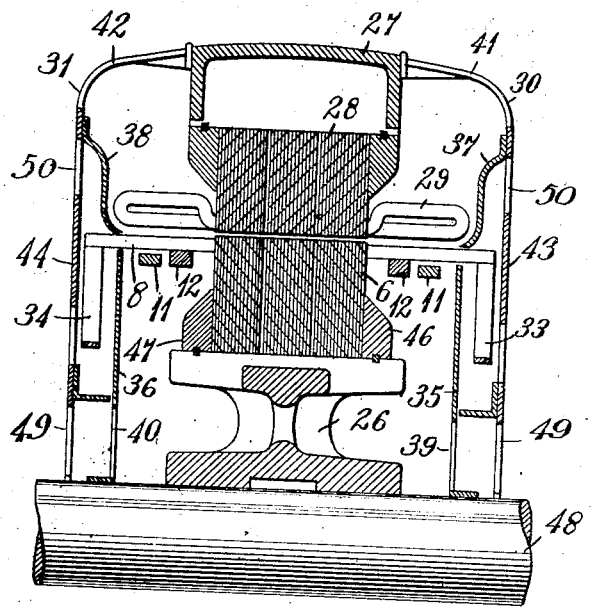
Figure 6:
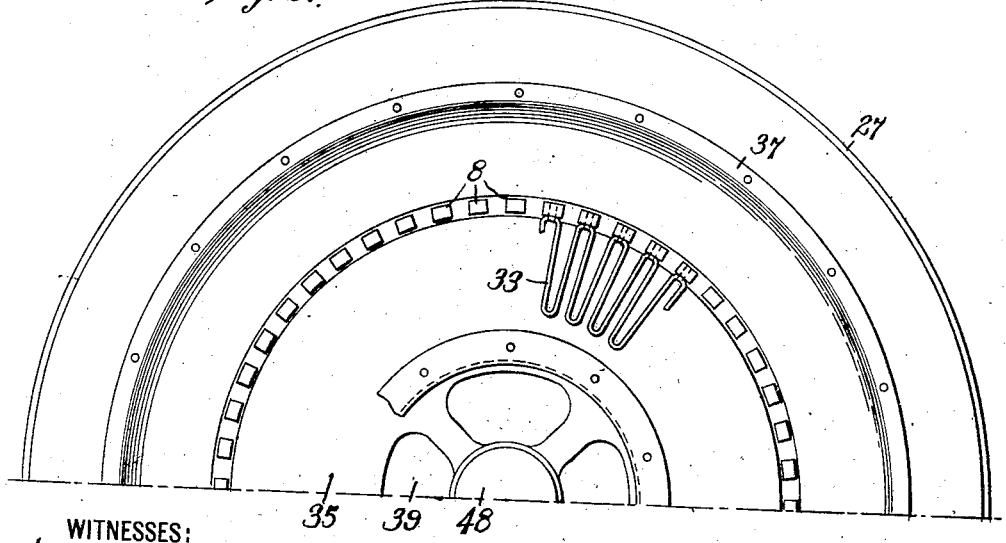

Figure 1 of the accompanying drawings is a diagrammatic view of an induction motor embodying my invention. Fig. 2 is a partial, sectional elevation of a rotor corresponding to that shown diagrammatically in Fig. 1. Fig. 3 is a diagrammatic view of a rotor winding which may be used in connection with a four-speed motor. Fig. 4 is a view corresponding to Fig. 2 of a rotor having a modified form of winding embodying my invention. Fig. 5 is a sectional elevation of a portion of an induction motor, disclosing a stator and a rotor having structural features, which are particularly well adapted for use in connection with the novel rotor winding of my invention. Fig. 6 is an elevation at right angles to that of Fig. 5, a portion of the outer casing being removed to disclose the parts within.

Referring to Figs. 1 and 2 of the drawings, a stator winding 1 is supplied with energy from a supply circuit 2—3, a three-pole double throw switch 4 being provided for changing the stator connections in order to produce two different numbers of magnetic poles and two different operating speeds for the motor. The rotor 5 comprises a core member 6, having a plurality of peripheral slots 7 and a winding composed of bars 8 of conducting material located in the slots 7, and end connecting rings 9, 10, 11 and 12. The stator winding is similar to that described in Patent No. 811,644, granted February 6, 1906, to the Westinghouse Electric & Manufacturing Company, upon an application filed by Benjamin G. Lamme, and it may be replaced by any suitable stator winding which is adapted to produce more than one number of magnetic poles, means being provided for producing any one of the desired polar combinations. In the stator winding shown, A A' and B B' are the terminals of two portions of the main primary winding which are respectively connected to the contact terminals $c$, $d$, $e$ and $c$ of the double-throw switch 4, and C C' are the terminals of the auxiliary primary winding which are respectively connected to the contact terminals $c$ and $f$ of the said switch. An external resistance element R is included in the connection between the terminal C' and the contact terminal $f$, but this resistance may be omitted if the auxiliary winding C C' is composed of high-resistance metal, so that the resistance is in the winding itself. The switch 4 is shown in proper position for connecting the primary windings for starting conditions of the motor, or such that the two portions A A' and B B' of the main primary winding are connected in series relation and the number of magnetic poles induced thereby is twelve. When the position of the switch 4 is reversed, the primary windings are connected in parallel, the current in the winding B B' being reversed in direction and the number of poles being thereby changed from twelve to six. The auxiliary winding and its resistance R are also excluded from the circuit. The circuit connections of the rotor, and particularly those of the end connecting rings 11 and 12, are clearly set forth in the diagram of Fig. 1 in which the bars 8 are represented by a series of parallel lines and the rings are represented by lines that cross the bars, with which they come in contact, at right angles. The bars 8 may be divided into a series of groups $a$ and $b$, each of the groups being composed of those bars which are included within the pole pitch of the 12-pole stator winding and each pair of adjacent groups $a$ and $b$ being composed of those bars which are included within the pole pitch of the 6-pole stator winding. It will be observed that ring 11 interconnects groups $a$ of the bars 8, that alternate with groups $b$, which are interconnected by the ring 12. The directions of current which the potentials induced in the rotor tend to produce in the bars 8, when the motor is operating as a 12-pole machine, are indicated by the arrows 13, and those produced when the motor is operating as a 6-pole machine are indicated by arrows $13^a$. When the motor is operating as a 12-pole machine, there is no possibility of an interchange of large currents through the rings 11 and 12, since the direction of current in all the bars connected by each ring is approximately the same, as indicated by the arrows 13. If, however, the motor is operating as a 6-pole machine, currents of opposite direction tend to flow through adjacent groups $a$ of the bars 8 which are connected by the same ring, as indicated by the arrows $13^a$, and hence there is a transfer of current between the groups, not only through the end rings 9 and 10, but also through the auxiliary rings 11 and 12. By suitably proportioning the resistances of the rings 9, 10, 11 and 12 the slip of the motor at the highest speed, that is, when operating with six poles, may be made relatively slight since the rings 11 and 12 are connected in parallel relation to the rings 9 and 10, and the slip of the motor may be made relatively large when the machine is operating with twelve poles since the rings 11 and 12 are then inactive.

It is evident that the arrangement described above may be advantageously utilized for starting induction motors when a relatively large starting torque is essential.

Auxiliary rings corresponding to rings 11 and 12 may, of course, be provided adjacent to the ring 9 if the electrical or mechanical design of the machine renders a symmetrical arrangement desirable.

In the diagram of Fig. 3, auxiliary rings 14, 15, 16 and 17 are employed in lieu of the rings 11 and 12 of Fig. 1, the bars 8 in this diagram being divided into two sets of groups $a$ and $b$, and $c$ and $d$ so that the slip of the motor may be predetermined and adjusted for operation at four different speeds, the stator winding, (not shown), being arranged to produce either four, six, eight or twelve poles. The principle of operation, however, is substantially the same as that already described in connection with the diagram of Fig. 1.

When a relatively large torque at a slow speed is desired for starting purposes, or in some other cases, it may be found advantageous to provide an independent starting winding in order that its resistance may be materially increased without danger of destroying the end connecting rings. An arrangement of this kind is illustrated in Fig. 4. The bars 18 and the end connecting rings 19 and 20 constitute the starting winding and the bars 21 and the rings 22, 23, 24 and 25 constitute the high-speed operating winding. When operating at the lower speed, only the high-resistance winding will be active (the circuit connections of the rings 22, 23, 24 and 25 corresponding to those of the rings 11 and 12) and, when the machine is operating at its higher speed, both windings will be active.

Referring to Figs. 5 and 6 of the drawings, in which corresponding parts are designated by the same reference characters as those employed in the other figures, the core member 6 of the rotor is mounted on a spider 26 and is held in place by end plates or rings 46 and 47. The stator comprises a stationary frame 27, a core member 28, a primary winding 29 and end bells 30 and 31. Bars 8 are located in the usual core slots of the rotor and are interconnected by means of zigzag straps 33 and 34 of conducting material, which are secured to the bars at their ends and constitute relatively high-resistance end rings. Auxiliary rings 11 and 12, corresponding to those shown in Fig. 2 of the drawings, are also secured to the bars 8, but are located relatively close to the core member 6. A pair of baffle plates 35 and 36 are mounted on a shaft 48 and extend outwardly between the rings 11 and the rings 33 and 34. Stationary baffle plates 37 and 38 are secured to the end bells 30 and 31, respectively, and project inwardly so that their edges are substantially opposite the edges of the baffle plates 35 and 36. By this means, ventilating passages are provided from a point near the shaft 48, through a plurality of holes 39 and 40, which are provided in the plates 35 and 36, and out through holes 41 and 42 which are provided in the end bells. At the same time, the high-resistance rings 33 and 34 are ventilated by drafts of air which are directed from openings 49 through the outer chambers 43 and 44 to openings 50 of the end bells. The principal advantage of this arrangement is due to the fact that the heat generated in the high-resistance rings 33 and 34, greatly exceeds that generated in any other part of the motor, and consequently, the adjacent parts may be kept at lower temperatures when means are employed for preventing the heat radiated from the high-resistance rings from passing into contact with the other parts.

It is evident that modifications may be effected in the structure illustrated in the drawings and that changes may be made in the circuit connections shown without departing from the spirit of my invention. I desire that only such limitations shall be imposed as are indicated in the appended claims.

I claim as my invention:

1. In an induction motor, the combination with a primary winding adapted to produce a plurality of polar combinations, of a secondary winding comprising a plurality of bars, end connecting rings therefor, and auxiliary rings for connecting the bars in sets of groups.

2. A secondary winding for non-synchronous motors comprising a plurality of rods or bars, end rings for connecting said bars, and auxiliary rings which permanently connect said bars in two sets of equal and alternately disposed groups.

3. In an induction motor, the combination with a primary winding adapted to produce a plurality of polar combinations, of a secondary winding comprising a plurality of rods or bars, end rings for connecting said bars, and auxiliary rings which permanently connect said bars in two sets of equal groups.

4. The induction motor, the combination with a primary winding adapted to produce a plurality of polar combinations, of a secondary winding comprising a plurality of rods or bars, end connecting rings for said bars of relatively high resistance, and auxiliary end connecting rings which act as a shunt for said first named rings only when a certain polar combination obtains.

5. In an induction motor, in combination with a primary winding adapted to produce a plurality of polar combinations, a secondary winding comprising a plurality of bars divided into groups, means for connecting said bars to conduct currents in the same direction in adjacent groups when a certain polar combination obtains and to conduct currents in opposite directions in said adjacent groups when a second polar combination obtains.

6. In an induction motor, in combination with a primary winding adapted to produce a plurality of polar combinations, of a secondary winding comprising a plurality of rods or bars divided into two sets of groups, and means for connecting the groups of each of said sets to correspond to the poles in one polar combination, and means for connecting said bars to adapt adjacent pairs of said groups to correspond to the poles when a second polar combination obtains.

7. In an induction motor, in combination with a primary winding adapted to produce a plurality of polar combinations for effecting motor speed adjustments, of a secondary winding comprising a plurality of bars, and connecting rings therefor and auxiliary rings for connecting the bars in such groups as to constitute a plurality of shunt-circuits to the end rings only when predetermined polar combination obtain.

In testimony whereof, I have hereunto subscribed my name this 28th day of July, 1909.

R. E. HELLMUND.

Witnesses:
Charles W. McGhee,
R. J. Dearborn.

---

It is hereby certified that in Letters Patent No. 1,116,424, granted November 10, 1914, upon the application of Rudolf E. Hellmund, of Pittsburgh, Pennsylvania, for an improvement in "Induction-Motors," an error appears in the printed specification requiring correction as follows: Page 3, line 74, for the word "and" read *end;* and that the said Letters Patent should be read with this correction therein that the same may conform to the record of the case in the Patent Office.

Signed and sealed this 15th day of December, A. D., 1914.

[SEAL.]

J. T. NEWTON,

*Acting Commissioner of Patents.*